United States Patent [19]
Schlanger

[11] Patent Number: 4,805,213
[45] Date of Patent: Feb. 14, 1989

[54] RING DETECTOR
[75] Inventor: William J. Schlanger, Laguna Beach, Calif.
[73] Assignee: Unison Technologies, Inc., Mission Viejo, Calif.
[21] Appl. No.: 14,626
[22] Filed: Feb. 13, 1987
[51] Int. Cl.⁴ ............................................. H04M 3/22
[52] U.S. Cl. .................................. 379/373; 379/377; 379/230
[58] Field of Search ............... 379/372, 373, 375, 377, 379/378, 379, 380, 382, 418, 252, 253, 254, 255, 228, 229, 230, 231, 233, 234

[56] References Cited
U.S. PATENT DOCUMENTS

| 4,056,689 | 11/1977 | Freimanis | 379/413 |
| 4,119,806 | 10/1978 | Baratin | 379/378 |
| 4,429,186 | 1/1984 | Gartner | 379/413 X |
| 4,458,112 | 7/1984 | Svala | 379/413 X |

FOREIGN PATENT DOCUMENTS
2146201  4/1985  United Kingdom ................ 379/377

Primary Examiner—Jin F. Ng
Assistant Examiner—Randall S. Vaas
Attorney, Agent, or Firm—Loyal M. Hanson

[57] ABSTRACT

A device for detecting a specified signal on a conventional telephone line includes a pair of input terminals to which to connect a pair of conventional telephone lines, and a circuit connected to the input terminals that draws a different amount of power from a separate power source when the specified signal is present across the input terminals thant it draws otherwise. A transformer couples the power supply to the circuit while isolating the power source from the input terminals, and power sensing circuitry that senses a difference in power supplied to the transformer generates a control signal that is also isolated from the input terminals.

12 Claims, 1 Drawing Sheet

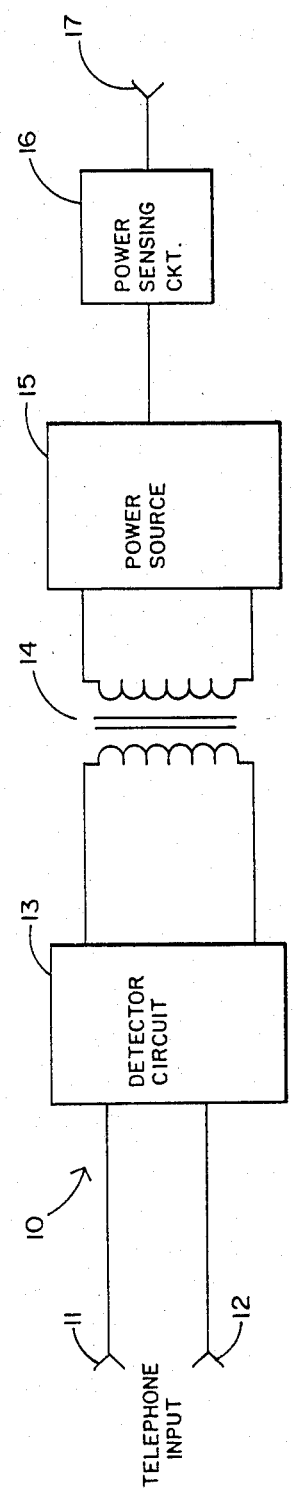
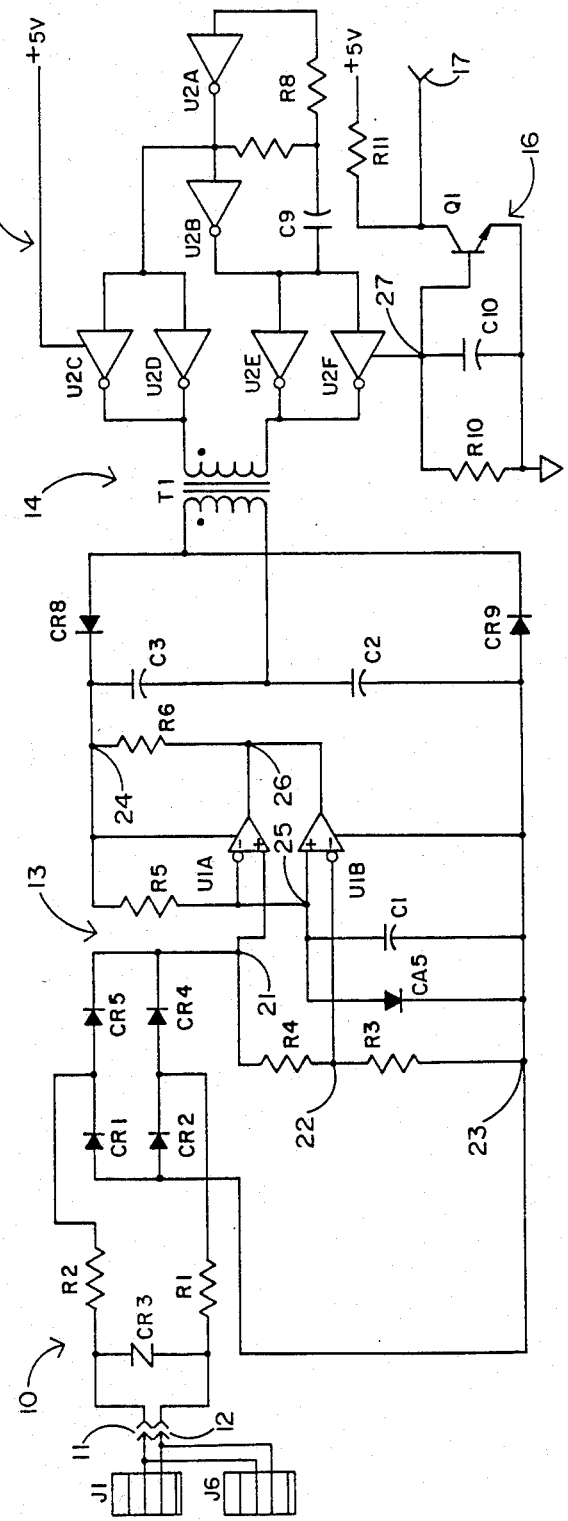
FIG. 1
FIG. 2

RING DETECTOR

This application is related to the copending application Ser. No. 014,705 filed herewith on Feb. 13, 1987 entitled "Uninterrupted Power Supply system."

BACKGROUND OF THE INVENTION

1. Technical Field

The invention described in this application relates generally to telephone equipment, and more particularly to a new and improved arrangement for detecting a specified signal on a pair of conventional telephone lines.

2. Background Information

Among the various signals carried by a conventional pair of telephone lines, an alternating current signal of approximately ninety volts represents a ring signal, a direct current signal of approximately fifty volts represents an on-hook or quiescent state signal, and a direct current signal of approximately ten volts represents an off-hook signal. These signals are used with a conventional telephone, but they may also be used for other purposes, such as remote turn-on and other control purposes.

However, in doing this it is necessary to isolate the telephone lines from the attached equipment. Various circuits exist for accomplishing this, but they are often relatively complicated and expensive, some employing optocouplers and related techniques. Consequently, it is desirable to have a new and improved device for detecting a specified signal on a pair of conventional telephone lines that accomplishes isolation, simply and conveniently, and with little component size and expense.

SUMMARY OF THE INVENTION

This invention recognizes the problems associated with the prior art and provides a new and improved container with the desired attributes.

Briefly, the above and further objects of the present invention are realized with a detector circuit that utilizes transformer coupled power for isolated power-source purposes, and a power sensing circuit that detects changes in power supplied by the power source for isolated control-signal-generation purposes.

Generally, the device includes a pair of input terminals to which to connect a pair of conventional telephone lines, and a circuit connected to the input terminals that draws a different amount of power from a separate power source when a specified signal is present across the input terminals than it draws when the specified signal is not present.

An isolation transformer having a first winding to which power is supplied from the separate power source and a second winding from which the circuit draws power isolates the power source from the input terminals. A power sensing arrangement generates a control signal by sensing a difference in the amount of power supplied to the first winding of the transformer so that the power sensing arrangement and the control signal are also isolated from the input terminals.

One aspect of the invention includes an oscillator that provides alternating current to the transformer to power the circuit. Another aspect includes a sensing circuit that senses a difference in power supplied to the oscillator. Yet another aspect provides a rectifier and comparator combination for detecting a ninety-volt alternating current (AC) ring signal and a ten-volt direct current (DC) Off-hook signal.

This is all accomplished with a few relatively small and inexpensive components in a novel circuit arrangement that both detects and isolates.

BRIEF DESCRIPTION OF THE DRAWINGS

FIG. 1 of the drawings is a schematic block diagram of a device constructed according to the invention; and FIG. 2 is a schematic circuit diagram of the device.

DESCRIPTION OF THE PREFERRED EMBODIMENTS

Referring now to FIG. 1, there is shown a schematic block diagram of a new and improved device 10 constructed according to the invention. It receives one or more signals from a pair of lines connected to terminals 11 and 12, such as a conventional pair of telephone lines (not shown), and it generates an output control signal whenever a specified combination of the signals occurs, including an individual occurrence.

One or more signals on a pair of conventional telephone lines are coupled to the input terminals 11 and 12. For convenience in describing the invention, the telephone lines are referred to as a positive telephone line and a negative telephone line. The signals these lines impress across the input terminals 11 and 12 may include typical telephone control signals, such as a ninety volt AC signal or ring signal, a fifty volt DC signal or quiescent signal, and a ten volt DC signal or an off-hook signal. In addition, the telephone lines can also provide typical data signals, such as analog or digital data signals, including the conventional touch tone signals.

Although the device 10 is designed to detect a ring signal and an off-hook signal, detection of any other of various combinations of one or more telephone control signals and data signals can be detected according to various ones of the inventive concepts disclosed.

In this regard, the illustrated device 10 generates an output control signal when either one of a conventional ring signal and a conventional off-hook signal occurs. The output control signal is intended for use in other circuitry (not shown) that is to be controlled or otherwise activated according to the occurrence of the specified combination of signals.

One example of circuitry that is controlled in this manner is described in the above-identified copending application entitled "Uninterrupted Power Supply System." The circuitry utilizes a ring ring detector to provide a remote turn-on capability, and that application is incorporated herein by reference for the details provided. Of course, the output control signal can be used for any of many other purposes.

The lines may be connected directly to the input terminals 11 and 12 because isolation is provided as subsequently described. The input signals impressed across the input terminals 11 and 12 are coupled to a detector 13. The detector 13 employs circuitry responsive to the specified combination of signals for changing the amount of power used by the detector 13. In other words, the detector 13 is powered by alternating current (AC) coupled through an isolation transformer 14 from a source 15.

When the specified combination of one or more signals occurs (a ring signal, for example) the detector 13 draws a different amount of power from the source 15, and the resulting change in power delivered by source 15 is sensed by a power sensing circuit 16. The power sensing circuit senses the change in power at the power source 15 side of the transformer and generates a signal indicative of the change in power that is coupled to an output port 17. This is the output control signal, and both it and the power sensing circuit 16 are isolated from the input terminals 11 and 12 also.

Thus, the device 10 generates a desired control signal and provides desired isolation, and it does so very simply and inexpensively. Of course, many other detector circuit arrangements can be devised within the inventive concepts disclosed of sensing variations in power supplied to the detector for purposes of generating an isolated output control signal.

Further details of the device 10 are illustrated in the schematic circuit diagram of FIG. 2. A pair of conventional telephone line jacks J1 and J2 receive mating plugs (not shown) to connect the positive telephone line and the negative telephone line to the input terminals 11 and 12, and provide a parallel connection into which to plug a telephone (not shown). An input signal to be detected is coupled in this manner from the telephone lines to the input terminals 11 and 12.

A metal oxide varistor CR3 serves the function of eliminating voltage spikes, and the input signal is coupled past the varistor CR3 and through a pair of resistors R1 and R2 to a diode bridge consisting of four diodes CR1-CR4. The diode bridge passes the input signal irrespective of the polarity. In other words, either one of the positive and the negative telephone lines can be connected to either one of the input terminals 11 and 12 and the device 10 still works.

A pair of resistors R3 and R4 across the output of the diode bridge combine with the resistors R1 and R2 to form a voltage divider that develops a lower range of voltages for coupling from a pair of nodes 21 and 22 relative to a third node 23 to a comparator circuit that is responsive to a ring signal and an off-hook signal. The comparator circuit may employ an LP339 for this purpose that includes a first comparator U1A and a second comparator U1B. In addition, the resistors R1 and R2 may each be 5.6 Meg.-ohm, the resistor R4 180K-ohm, and the resistor R5 91K-ohm to develop suitable voltages at the nodes 21 and 22.

A ring signal impressed across the input terminals 11 and 12 causes the comparator U1A to draw more current through a resistor R6. Similarly, an off-hook signal causes the comparator U1B to draw more current through the resistor R6. If neither a ring signal nor an off-hook signal is present, both comparators U1A and U1B respond so that less current is drawn through the resistor R6. Thus, either the ring signal or the off-hook signal causes the detector 13 to draw a different amount of power from the separate power source 15 than it does when neither signal is present.

This is reflected in the power delivered to the transformer T1 (corresponding to the transformer 14 in FIG. 1). A power supply signal designated +5V is coupled to an oscillator circuit consisting of a plurality of six inverters U2A-U2F, such as those commonly known as type 4049 CMOS Hex inverters. These are connected with a pair of resistors R8 and R9 and a capacitor C9 in a five kilohertz oscillator configuration. The output of this oscillator is coupled to a primary or first winding of the transformer T1. The secondary or second winding of the transformer T1 is coupled to a pair of diodes CR8 and CR9 that are connected with a pair of capacitors C2 and C3 in a rectifier circuit developing approximately twelve volts between a node 24 and the node 23.

The voltage across the nodes 23 and 24 powers the comparators U1A and U1B. It also causes a current to flow through a resistor R5 and a diode CR6 to develop a reference voltage of approximately seven tenths volts at a node 25 connected to the inverting input of the comparator U1A and the noninverting input of the comparator U1B. A capacitor C1 is used to bypass unwanted signals components to the node 19.

When the signal across the input terminals 11 and 12 is less than approximately ninety volts (indicating no ring signal) and more than a predetermined level in the range of approximately ten to twenty-five volts (indicating no off-hook signal), both the comparators U1A and U1B respond so that the voltage at a node 26 (the output of the comparators U1A and U1B) approaches the voltage level on the node 24. Thus, less current flows through the resistor R5. In addition, very little current is drawn by the detector circuit in this state.

When the signal across the input terminals 11 and 12 is approximately ninety volts, the comparator U1A responds to cause the voltage level at the node 26 to approach the voltage level of the node 23 so that more current flows through the resistor R6. When the signal across the input terminals 11 and 12 is less that the predetermined level of ten to twenty-five volts (approximately twenty-five volts in the illustrated embodiment), the comparator U1B responds to cause the voltage level at the node 26 to approach the voltage level of the node 23 so that more current flows through the resistor R6. Thus, in either the case of a ring signal or an off-hook signal more current flows through the resistor R6 and a different amount of power is drawn from the power source 15.

A difference in the amount of power supplied to the first winding of the transformer T1 is detected by detecting the difference in the amount of power supplied to the oscillator circuit. This is done with a resistor R10 (220-ohm in the illustrated embodiment) connected to the inverters U2A-U2F in a manner suitable to develop a voltage at a node 27 that varies according to the power supplied to the oscillator circuit. When the voltage at node 27 increases (indicating more power is being supplied), this voltage drives a suitable switching transistor Q1 that is supplied by the +5V power supply signal through a resistor R11 to develop the output control signal at the output port 17.

Thus, the power source, the sensing circuitry, and the output control signal are all isolated from the input terminals. This is all accomplished with a few relatively small and inexpensive components in a novel circuit arrangement that both detects and isolates.

Although an exemplary embodiment of the invention has been shown and described, many changes, modifications, and substitutions may be made by one having ordinary skill in the art without necessarily departing from the spirit and scope of this invention.

What is claimed is:
1. A device, comprising:
a pair of input terminals to which to connect a pair of conventional telephone lines;
detector means, including a circuit connected to the input terminals that is powered by a separate power source, for drawing a different amount of power from the separate power source when a specified signal is present across the input terminals than it draws when the specified signal is not present;

isolation means, including a transformer having a first winding to which power is supplied from the separate power source and a second winding from which the circuit draws power, for isolating the power source from the input terminals; and power sensing means for generating a control signal by sensing a difference in the amount of power supplied to the first winding of the transformer so that the power sensing means and the control signal are also isolated from the input terminals;

wherein the circuit connected to the input terminals is connected between the second winding of the transformer and the input terminals;

wherein the circuit connected to the input terminals includes first rectifier means connected to the second winding of the transformer for generating a direct current from power supplied by the separate power source to power the circuit and second rectifier means connected to the input terminals for converting an AC component of a signal present across the input terminals to a direct current; and wherein the circuit connected to the input terminals includes first comparator means for drawing a different amount of power if a voltage of approximately ninety volts is present across the input terminals to thereby detect a ring signal.

2. A device as recited in claim 1, further comprising:
oscillator means for converting DC power received from the separate source to AC power that is supplied to the first winding.

3. A device as recited in claim 2, wherein the power sensing means includes:
means for sensing a difference in the amount of power delivered by the oscillator means to the first winding of the transformer.

4. A device as recited in claim 3, wherein the means for sensing a difference in the amount of power includes:
means for sensing a change in current supplied by the separate power source to the oscillator means.

5. A device as recited in claim 2, wherein:
the oscillator means generates alternating current having a frequency substantially greater than sixty Hertz.

6. A device as recited in claim 1, wherein the second rectifier means includes:
a diode bridge.

7. A device as recited in claim 1, wherein:
the first comparator means draws more power if a voltage of approximately ninety volts is present across the input terminals.

8. A device as recited in claim 1, wherein the circuit includes:
second comparator means for drawing a different amount of power if a voltage of approximately ten volts is present across the input terminals.

9. A device as recited in claim 8, wherein:
the second comparator means draws more power if a voltage of approximately ten volts is present across the input terminals.

10. A method of detecting a signal on a pair of conventional telephone lines, comprising:
connecting the pair of telephone lines to a pair of input terminals;

using a circuit connected to the input terminals to draw a different amount of power from a separate power source when a specified signal is present across the input terminals than the circuit draws when the specified signal is not present;

supplying power from the separate power source to a first winding of a transformer having a second winding connected to the circuit to thereby isolate the separate power source from the input terminals; and generating a control signal by sensing a difference in the amount of power supplied to the first winding with suitable power sensing means so that the power sensing means and the control signal are also isolated from the input terminals;

wherein the step of using a circuit connected to the input terminals to draw a different amount of power includes drawing a different amount of power if a voltage of approximately ninety volts is present across the input terminals to thereby detect a ring signal.

11. A method as recited in claim 10, further comprising:
drawing a different amount of power if a voltage of approximately ten volts is present across the input terminals to thereby detect an off-hook signal.

12. A method as recited in claim 10, wherein the step of supplying power from the separate power source includes:
converting a direct current supplied by the separate power source to a high frequency alternating current;

coupling the high frequency alternating current to the first winding of the transformer and a rectifier to the second winding;

using an output of the rectifier to power the circuit; and sensing a difference in the amount of power supplied to the first winding to generate a control signal that is isolated from the input terminals.

* * * * *